(12) United States Patent
Leydon

(10) Patent No.: US 9,130,396 B2
(45) Date of Patent: Sep. 8, 2015

(54) KINETICALLY CHARGEABLE STYLUS DEVICE

(71) Applicant: Disney Enterprises, Inc., Burbank, CA (US)

(72) Inventor: Krispin Leydon, La Canada Flintridge, CA (US)

(73) Assignee: Disney Enterprise, Inc., Burbank, CA (US)

( * ) Notice: Subject to any disclaimer, the term of this patent is extended or adjusted under 35 U.S.C. 154(b) by 307 days.

(21) Appl. No.: 13/735,891

(22) Filed: Jan. 7, 2013

(65) Prior Publication Data

US 2014/0191711 A1    Jul. 10, 2014

(51) Int. Cl.
*H02J 7/00* (2006.01)
*H02J 7/02* (2006.01)
*H02K 35/02* (2006.01)
*H02K 35/04* (2006.01)

(52) U.S. Cl.
CPC ................. *H02J 7/025* (2013.01); *H02K 35/02* (2013.01); *H02K 35/04* (2013.01)

(58) Field of Classification Search
CPC .................................................... G06F 3/03545
USPC .......................................... 320/108, 107, 138
See application file for complete search history.

(56) References Cited

U.S. PATENT DOCUMENTS

| | | | | |
|---|---|---|---|---|
| 7,232,238 | B2 * | 6/2007 | Long et al. ..................... | 362/192 |
| 2005/0052265 | A1 * | 3/2005 | Vladimirescu et al. ........ | 335/229 |
| 2007/0278997 | A1 * | 12/2007 | Chang et al. .................. | 320/108 |
| 2009/0171404 | A1 * | 7/2009 | Irani et al. ......................... | 607/2 |
| 2011/0279081 | A1 * | 11/2011 | Cacioppo et al. ............. | 320/108 |
| 2013/0106770 | A1 * | 5/2013 | Bakken et al. ................ | 345/174 |

* cited by examiner

*Primary Examiner* — Drew A Dunn
*Assistant Examiner* — Christopher Nettles
(74) *Attorney, Agent, or Firm* — Farjami & Farjami LLP

(57) ABSTRACT

There is provided a system and method for a kinetically chargeable stylus device for use with an interactive device. The method comprises charging the kinetically chargeable stylus device using one of a first mode and a second mode, wherein the first mode includes receiving a movement of a magnet in relation to an inductor, inducing a first electrical current in the inductor from the movement, and charging an energy storage unit using the first electrical current, and wherein the second mode includes inducing a second electrical current in the inductor from a non-kinetic source, and charging the energy storage unit using the second electrical current. Prior to inducing the second electrical current in the inductor, the magnet may be isolated from the inductor. Further, a movement of the stylus device may be detected using the inductor and the magnet.

16 Claims, 4 Drawing Sheets

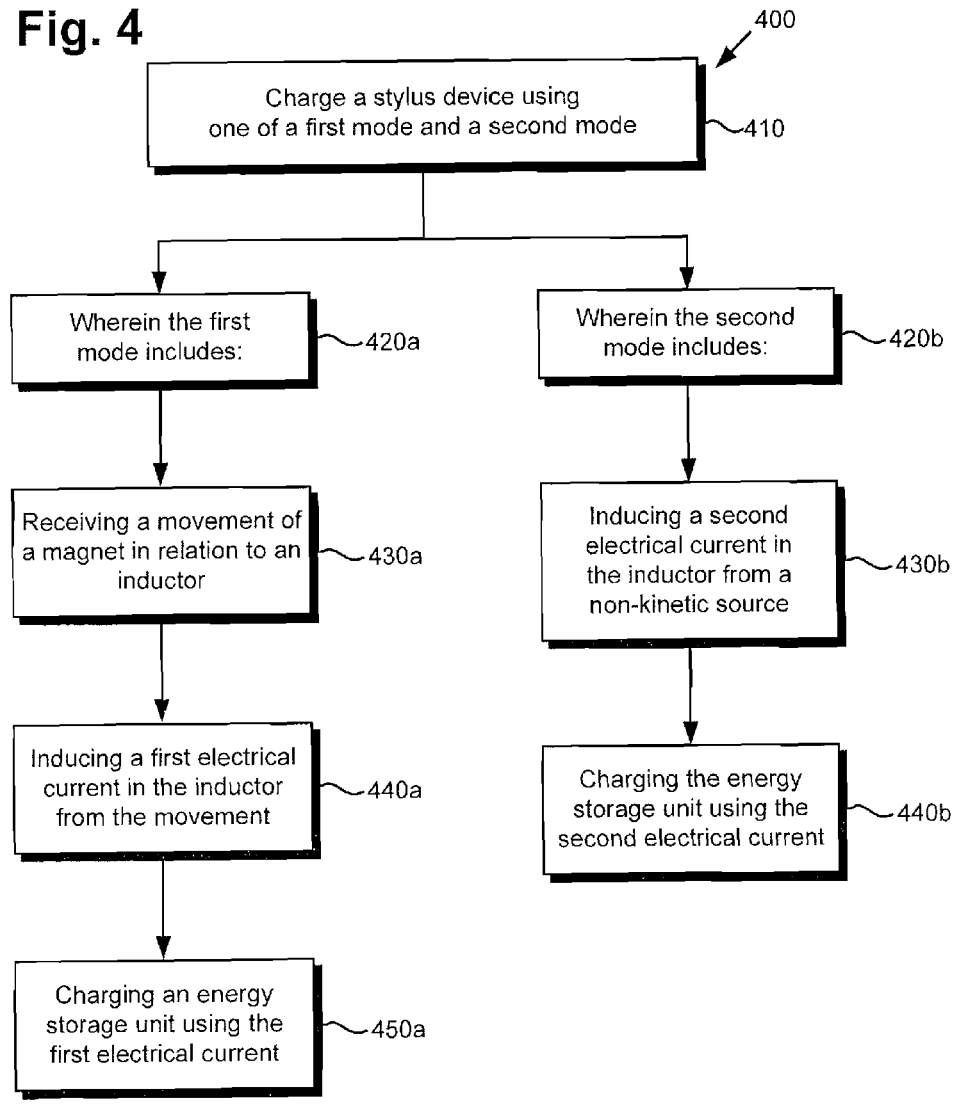

KINETICALLY CHARGEABLE STYLUS DEVICE

BACKGROUND

Interactive devices with touch-sensitive screens have become prevalent. Such devices commonly range from large computer displays to smaller hand-held tablet devices, all the way down to small cell phones and data storage devices.

In the past, users of interactive devices with touch-sensitive screens have typically manipulated touch screen-based interfaces through finger/thumb contact/proximity. Increasingly, however, pen-like devices—styli—are being used as an alternative/complement to finger-based input, most frequently in the context of writing, drawing, and painting activities.

Today's styli for interactive touch-screen devices are predominantly passive (not electrically powered) devices, however active styli incorporating electrically powered features (such as switches, pressure sensors, processors, and transmitters) are beginning to appear on the market. Active, electrically powered styli can advantageously provide users with new/additional/different capabilities, which are preferable for supporting particular kinds of tasks and interactions. For example, a stylus with sensor-enabled pressure-sensitivity can support varying the darkness of a virtual drawn line within a sketching application that is operating on a touch-sensitive device that is in communication with the stylus.

In order for an active stylus' powered electronic aspects to function, a source of electrical power is required. Some active styli are powered wirelessly from a device incorporating a screen through inductive coupling. Other active styli are powered through a power cord while in use. However, each of the aforementioned power sources have distinct advantageous and drawbacks. For instance, attached power cords may become tangled or limit mobility.

Still other active styli include their own internal reservoirs for electrical power, such as a replaceable and or rechargeable cell/battery. Styli with their own internal power reservoirs are advantageous in many respects, but require a user to ensure that enough charge is available for use. As a result, users of active styli, which contain their own charge reservoirs, may find that their styli are without power at inopportune times—with no convenient way to address this lack of power.

SUMMARY

The present disclosure is directed to a kinetically chargeable stylus device, substantially as shown in and/or described in connection with at least one of the figures, as set forth more completely in the claims.

BRIEF DESCRIPTION OF THE DRAWINGS

FIG. 4 presents an exemplary flowchart illustrating a method for use by a kinetically chargeable stylus device.

DETAILED DESCRIPTION

Figure 1:
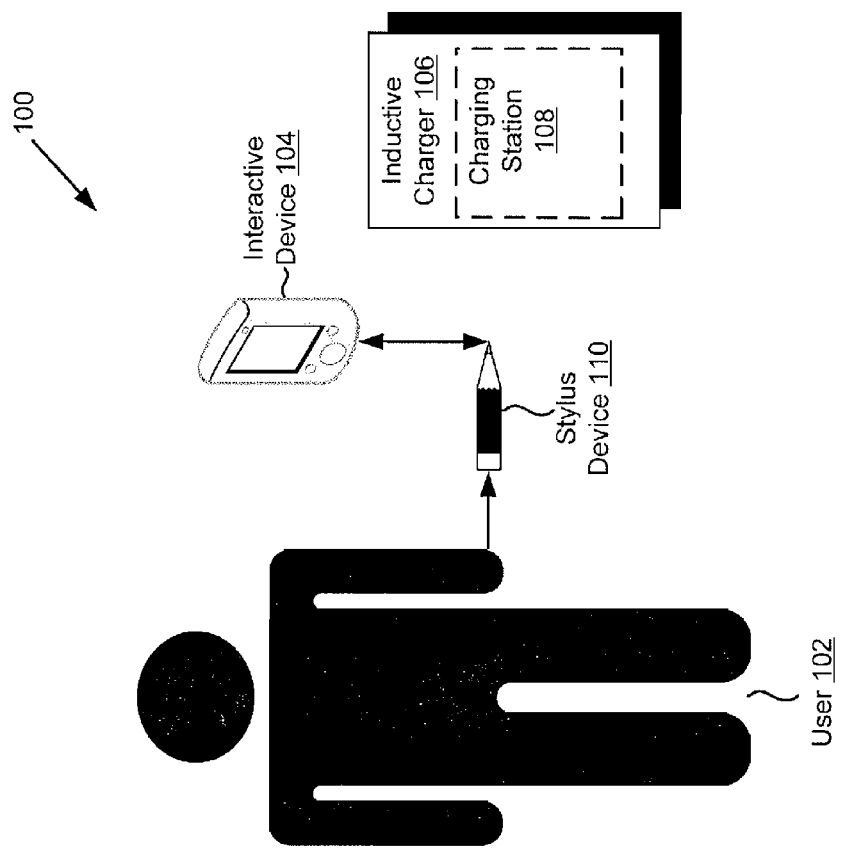
FIG. 1 presents an exemplary system environment including a user utilizing a kinetically rechargeable stylus device with an interactive device.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents an exemplary system environment including a user utilizing a kinetically rechargeable stylus device with an interactive device. System environment 100 includes user 102, interactive device 104, inductive charger 106, charging station 108, and stylus device 110. As shown in FIG. 1, user 102 is utilizing stylus device 110 with interactive device 104. Additionally, system environment 100 contains inductive charger 106 with charging station 108 capable of charging interactive device 104, stylus device 110, and other user devices.

In the implementation of FIG. 1, user 102 may be utilizing interactive device 104 to access, control, and use an application. Interactive device 104 may correspond to a PDA, cell phone, table computer, or even a larger home computer with touch sensitive screen. Thus, interactive device 104 may offer user 102 a touch sensitive screen for use with applications. For example, user 102 may access a drawing application on interactive device 104, or may access a writing application. The application and/or interactive device 104 may incorporate an active stylus, such as stylus device 110. Stylus device 110 may be preferable due to increased speed and/or precision in drawing and writing, or for features included with stylus device 110. Thus, user 102 may desire to use stylus device 110 with interactive device 104.

However, stylus device 110 requires power to utilize active styli features, such as pressure sensors and/or movement detection modules. For example, stylus device 110 may include pressure sensors capable of detecting pressure to the tip of stylus device 110 and/or angle of use of stylus device 110. General active styli may use a direct connection to interactive device 104 as a power source. However, user 102 may find a direct connection undesirable under certain circumstances.

Thus, other active styli may utilize a conventional non-rechargeable power source or a rechargeable power source to provide power to the active styli. However, active styli are often used with mobile interactive devices where access to additional power sources are less common should the power source be drained. Thus, in certain situations, user 102 may only occasionally use the active stylus, and thus may forget to charge the rechargeable power source of the active stylus or find the non-rechargeable power source of active stylus is depleted. In other situations, user 102 may consistently use the active stylus and find they are running out of power during use. In order to resolve these situations, stylus device 110 may be kinetically chargeable as will be explained further in reference to FIGS. 2 and 3.

Furthermore, according to FIG. 1, stylus device 110 is also capable of being used with inductive charger 106. Inductive charger 106 may correspond to a mat, docking station or other configuration that creates an electromagnetic field to transfer energy to an inductor of stylus device 110 as will be explained further in reference to FIG. 3. Inductive charger 106 includes charging station 108 which may include additional features to assist in charging stylus device 110. Thus, stylus device 110 may further include a dual mode charger capable of being both kinetically chargeable and inductively chargeable.

Figure 2:
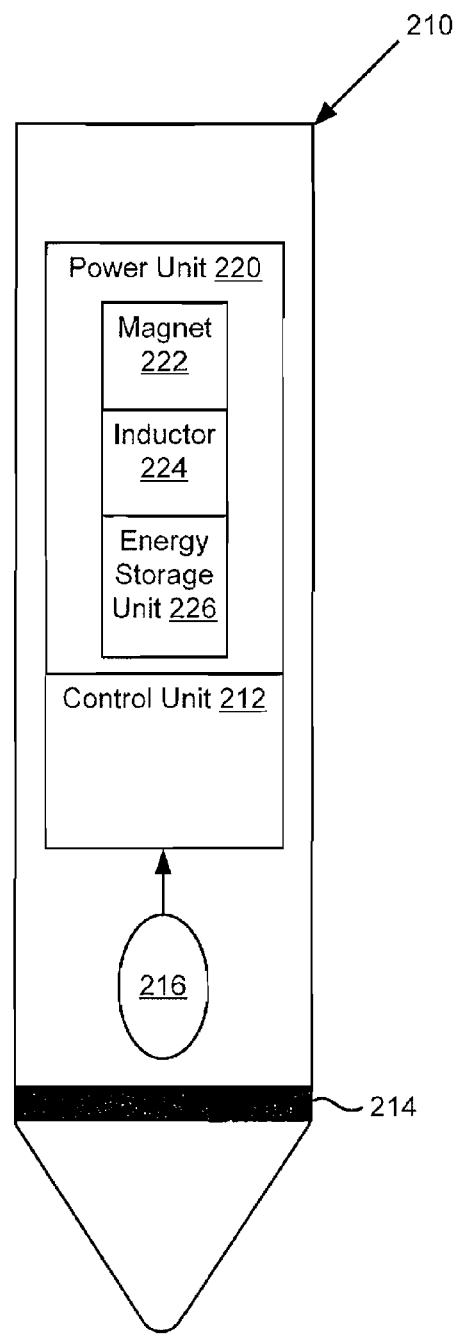
FIG. 2 shows a diagram of a more detailed kinetically chargeable stylus device.

Moving to FIG. 2, FIG. 2 shows a diagram of a more detailed kinetically chargeable stylus device. FIG. 2 presents stylus device 210 including control unit 212, stylus feature 214, input button 216, and power unit 220. Power unit 220 is shown including magnet 222, inductor 224, and energy storage unit 226. Although magnet 222, inductor 224, and energy unit 226 are shown stacked together, it is understood that various orientations of these features may also be utilized in stylus device 210 in order to provide a kinetically chargeable stylus device. Additionally, stylus device 210 may include further power conditioning or processing circuitry as one of ordinary skill in the art would appreciate.

According to FIG. 2, stylus device 210 includes control unit 212. Control unit 212 may correspond to a processor and memory unit sufficient to control interactive features of stylus device 210. For example, if stylus device 210 is further configured to sense pressure input to a stylus tip or nub, control unit 212 may include a processor and a memory capable of receiving the pressure inputs, properly interpreting them, and/or transmitting them to an interactive device. The processor may correspond to a hardware processor or microprocessor. However, in other implementations the processor refers to a general processor capable of performing the functions required of control unit 212. Further, the memory is a sufficient memory capable of storing commands, processes, and programs for execution by the processor. In other implementations, the memory may correspond to a plurality memory types or modules.

Stylus device 210 of FIG. 2 includes stylus feature 214. Stylus feature 214 may be an interactive feature of stylus device 210 requiring power. For example, stylus feature 214 may correspond to a pressure sensor or multiple pressure sensors. The pressure sensors may be capable of detecting a pressure applied to a tip of the stylus device by a user, similar to pressing a marker with increased for increased line thickness. Additionally, the pressure sensors may be capable of detecting an angle of usage of stylus device 210. For example, a user may hold stylus device 210 at a side angle for shading, similar to a technique an artist might use in a drawing. Pressure sensors may be capable of or aligned in an orientation to detect pressure and/or angle of use applied to an interactive device using stylus device 210. Thus, control unit 212 may utilize the pressure sensors of stylus feature 214 for detecting the pressure and/or angle of use inputs. Control unit 212 may then process the inputs and transmit the inputs to an interactive device. Thus, in certain implementations, stylus device 210 may further include a transmitter and/or receptor, such as a radio transmitter, blue-tooth connection, wireless connection, wired connection, or other transmitter.

FIG. 2 further shows stylus device 210 with input button 216. Input button 216 may correspond to a power button, feature select button, or other necessary input configurations to allow user to access features of stylus device 210. For example, stylus device 210 may be an active stylus with stylus feature 214 discussed above. Thus, input button 216 may correspond to a power button capable of turning the pressure sensors on/off in order to conserve power. In another implementation, stylus feature 214 may correspond to another interactive feature capable of being using with an interactive device, for example, a feature select in an application. Thus, input button 216 may allow for the feature selection in the application. In certain implementations input button 216 may correspond to one input button, however, in other implementations input button 216 may correspond to a plurality of input buttons. Furthermore, in other implementations, input button 216 is optional and/or absent from stylus device 210.

Stylus device 220 of FIG. 2 is further shown with power unit 220, including magnet 222, inductor 224, and energy storage unit 226. Power unit 220 may utilize magnet 222 and inductor 224 in order to provide a kinetic charge storable in energy storage unit 226. Magnet 222 may correspond to a material or object capable of producing a magnet field. For example, magnet 222 may correspond to a permanent magnet such as a ceramic, ferrite, Aluminum-Nickel-Cobalt, Neodymium-Iron-Boron, or Samarium-Cobalt magnet. However, in other implementations, magnet 222 may correspond to another object capable of emitting a magnetic field.

Inductor 224 of FIG. 2 corresponds to an inductor electrical component. Thus, inductor 224 may correspond to a conductive material in a coil configuration. Inductor 224 may correspond to an inductor with a air, vacuum, or gas core allowing magnet 222 to pass through the core. However, it is understood that inductor 224 may correspond to an inductor with a ferromagnetic core, or with another core material, such as a ceramic core. Inductor 224 may correspond to a single inductor or a plurality of inductors. Inductor 224 may be oriented to allow magnet 222 to pass through inductor 224, around inductor 224, or near inductor 224.

In order to induce an electrical current in inductor 224, electromagnetic induction is utilized. A changing magnetic flux through inductor 222 is created using magnet 222. The position of magnet 222 is changed in relationship to inductor 222. In order to create the changing position of magnet 222, magnet 222 may be given a range of movement. Magnet 222 may move through a core of inductor 224 in the present implementation. However, in another implementation, magnet 222 may be allowed to slide or move through a volume near or around inductor 224. Magnet 222 may perform the movement through the designated volume by kinetic force applied to stylus device 210. Thus, a user of stylus device 210 may shake stylus device 210 causing the movement of magnet 222. In another implementation, magnet 222 may be configured in a volume of movement sensitive enough that magnet 222 moves when jostled with less force, such as if stylus device 210 is travelling with the user. The volume of movement may be an open volume for magnet 222 to move. The volume of movement may have cushioning or walls sufficient to prevent damage to magnet 222. The cushioning may also be supplied through magnetic force, for example, by utilizing additional magnets surrounding magnet 222. However, the volume of movement may also be a track that magnet 222 is placed on with or without padded endings. The volume of movement may also be a chamber with or without a viscous or semi-viscous liquid to allow movement of magnet 222 without damage to magnet 222.

Although FIG. 2 shows magnet 222 and inductor 224 stacked, it is understood that various orientations may be used to provide a kinetically chargeable power unit. Inductor 224 may correspond to an inductor with an air core capable of allowing magnet 222 to pass through it. Magnet 222 may be given a range of movement through the core of inductor 224. Thus, magnet 222 may pass through inductor 224 to induce an electrical current in an electrical circuit with inductor 224. However, in another implementation, inductor 224 may correspond to a plurality of inductors arrange near or around magnet 222. Additionally, magnet 222 may correspond to a plurality of magnets moving near, around, or through inductor 224. Magnet 222 may move in relation to the plurality of inductors to induce an electrical current in each respective inductors circuit.

Through the movement of magnet 222 in relation to inductor 224, an electrical current is induced in a circuit with energy storage unit 226. The electrical current may be used to power stylus device 210, such as for use by control unit 212 and/or stylus feature 214. However, the electrical current may be used to charge energy storage unit 226. Energy storage unit 226 may correspond to a capacitor capable of being charged and used to power stylus device 210. However, energy storage unit 226 may also correspond to a rechargeable battery capable of storing a charge for a more prolonged period of time. Thus, the electrical current may recharge the battery of energy storage unit 226 in order to preserve a power charge usable by a user of stylus device 210 for a more prolonged period of time.

As previously discussed, input button 216 may also correspond to an input button capable of affecting power unit 220, such as an on/off switch for stylus feature 214. In another implementation, input button 216 may also correspond to an input button capable of preventing movement of magnet 222, such as by locking it into place. Input button 216 may therefore prevent movement of magnet 222 during using of stylus device 210, thereby prevent changing weight distribution or annoying sounds while utilizing stylus device 210. Additionally, input button 216 may be an input button capable of isolating magnet 222 from inductor 224. Input button 216 may magnetically shield or move magnet 222 so that inductor 224 is no longer susceptible to a magnetic field of magnet 222. Such an implementation may be preferable when inductor 224 is also used for inductive charging, as will be discussed in reference to FIG. 3. Input button 216 may do this through a mechanical or electrical implementation.

Magnet 222 and inductor 224 of FIG. 2 may be configured to provide further features to stylus device 210. Using magnet 222 and inductor 224, control unit 212 may detect movement of stylus device 210. For example, control unit 212 may be configured to detect changes in the induced current in inductor 224 from movement of magnet 222. Using the changes in the induced current, control unit 212 may determine a movement of stylus device 210. Thus, control unit 212 may detect an inversion of stylus device 210 while stylus device 210 is being used in an application of an interactive device. This may signal to control unit 212 to implement a feature, such as an erasing feature in the application of the interactive device, an undo feature, or any other programmable feature of the application. Further, based on the shaking of stylus device 210 during use, control unit 212 may determine another feature is being accessed if the user is not intending to charge stylus device 210. Movement of stylus device 210 may also correspond to an on/off trigger for stylus device 210, such as waking up stylus device 210 for use when movement is detected, or turning stylus device 210 off when no movement is detected. Thus, magnet 222 and inductor 224 may function as a gravity switch or accelerometer.

Figure 3:
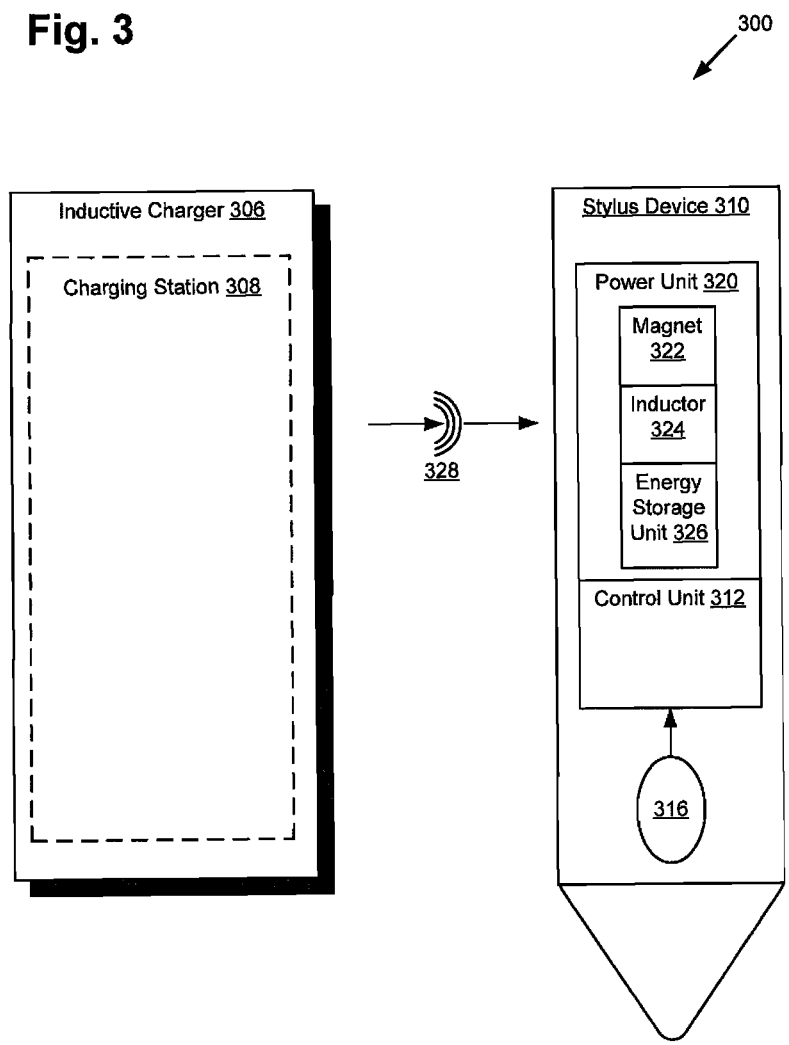
FIG. 3 shows an exemplary system with a dual mode kinetically chargeable stylus device and an inductive charger.

Moving to FIG. 3, FIG. 3 shows an exemplary system with a dual mode kinetically chargeable stylus device and an inductive charger. System environment 300 of FIG. 3 includes inductive charger 306 with charging station 308 producing electromagnetic field 328. Further shown in FIG. 3 is stylus device 310 with control unit 312, input button 316, and power unit 320 including magnet 322, inductor 324, and energy storage unit 326.

As previously discussed, stylus device 320 contains power unit 320 capable of being kinetically charged through movement of magnet 222 in relation to inductor 224 to induce an electrical current for charging energy storage unit 326. Energy storage unit 326 may provide the necessary power for use by control unit 212 and/or any other features of stylus device 320.

However, alternatively, stylus device 320 is also capable of being inductively charged using inductive charger 306. Inductive charger 306 may be a unit capable of creating electromagnetic field 328. Inductive charger 306 may be a household charging station, such as a wall inductive charger, or a more portable inductive charger, such as a USB charger. Inductive charger 306 generates electromagnetic field 328 capable of transferring energy to another inductor, such as inductor 324. For example, inductive charger 306 may be coupled to inductor 324 when stylus device 310 is placed near inductive charger 306. Thus, inductive charger 306 may induce an electrical current through a circuit of inductor 324 with a changing current in inductive charger 306.

Inductive charger 306 is shown with charging station 308. Charging station 308 may be a mat, stand, or other placement configuration for receiving stylus device 310. Thus charging station 308 may hold or lock into place stylus device 310 or may be a placement for charging multiple devices.

Isolation of magnet 322 from inductor 324 may be necessary during inductive charging using inductive charger 306. Further, it may be necessary to lock magnet 322 in place. Stylus device 310 may isolate magnet 322 using gravity. Charging station 308 may be configured so stylus device 310 has a specific orientation. Thus, using gravity, magnet 322 may slide into an area where magnet 322 is isolated from inductor 324 and/or locked into place.

As previously discussed, stylus device 310 includes input button 316 or other feature capable of isolating magnet 322 from inductor 324. Input button 316 may be capable of isolating magnet 322 from inductor 324 and/or locking magnet 222 into place. Thus, a user of stylus device 310 may utilize input button 316 to charge stylus device 310 using two different modes, by kinetic movement or from a non-kinetic source.

In another implementation, charging station 308 of inductive charger 306 may be configured to isolate magnet 322 when stylus device 310 is placed into charging station 308. Stylus device 310 may be connectable to charging station 308, such as with a docking port or holder. Charging station 308 may then mechanically or electrically isolate and/or prevent movement of magnet 322 while inductive charger 308 is charging energy storage unit 326. This may occur using a signal interpretable by control unit 312, such as an electrical signal when stylus device 310 is attached to charging station 308. Additionally, charging station 308 may mechanically isolate and/or prevent movement, such as through a connectable pin or other configuration, when stylus device 310 is attached to charging station 308. Any or all of the previous implementations may be used in order to effectively charge energy storage unit 312 of stylus device 310 using inductive charger 306.

FIGS. 1, 2, and 3 will now be further described by reference to FIG. 4, which presents flowchart 400 showing an exemplary method for use by a kinetically chargeable stylus device. With respect to the method outlined in FIG. 4, it is noted that certain details and features have been left out of flowchart 400 in order not to obscure the discussion of the inventive features in the present application.

Referring to FIG. 4 in combination with FIG. 1, FIG. 2, and FIG. 3, flowchart 400 begins with charging a stylus device 110/210/310 using one of a first mode and a second mode (410). The charging using one of a first mode and a second mode may be performed passively, for example by simply using stylus device 110/210/310 and thus causing magnet 222/322 to move near inductor 224/324. Additionally, the charging using one of a first mode and a second mode may be chosen by user 102 of stylus device 110/210/310 utilizing input button 216/316 or other input to select one of a first mode and a second mode. The selection of the first mode and the second mode may also be done without direct input from user 102. For example, user 102 may shake stylus device 110/210/310 or place stylus device 110/210/310 in a holder or orientation that selects the first mode and the second mode.

Input button 216/316 may select the first mode or the second mode for charging stylus device 110/210/310 by, for example, allowing magnet 222/322 to move in relation to inductor 224. Thus, input button 216/316 may unlock magnet 222/322 in order to allow movement of magnet 222/322 to create a kinetically chargeable stylus device. In another implementation, input button 216/316 may lock magnet 222/322 into place and/or magnetic shield, isolate, or remove magnet 222/322. In such an implementation, input button 216/316 may then allow inductive charging of energy storage unit 226/326 of stylus device 110/210/310.

Control unit 212/312 may also receive input from input button 216/316 in order to perform the charging stylus device 110/210/310 using one of a first mode and a second mode. Input button 216/316 may be connected to control unit 212/312. Control unit 212/312 may then receive input from input button 2J 6/316 and select the first mode or the second mode as described above. For example, control unit 212/312 may perform the isolation of magnet 222/322 or instruct power unit 220/320 to perform the isolation of magnet 222/322. Conversely, control unit 212/312 may unlock magnet 222/322 or instruct power unit 220/320 to allow movement of magnet 222/322 to allow for kinetic charging of energy storage unit 226/326 of stylus device 110/210/310.

Charging station 108/308 of inductive charger 106/306 may also select one of the first mode and the second mode. As previous discussed, stylus device 110/210/310 may be connected to charging station 108/308 and charging station 108/308 may instruct or configure stylus device 110/210/310 for inductive charging using the second mode. Charging station 108/308 may utilize electrical selection of the second mode, such as by instructing control unit 212/312, or mechanical selection, such as by isolating, moving, or removing magnet 22/322. Removal from charging station 108/308 may also allow for kinetic charging of stylus device 110/210/310, for example, by allowing magnet 222/322 to move again.

If the first mode is selected, flowchart 400 continues by branching to wherein the first anode includes (420a). As previously discussed, stylus device 110/210/310 may be charged using one of the first mode 420a and the second mode 420b. If the selection correspond to the first mode, flowchart 400 continues to 420a. The first mode may correspond to kinetically charging energy storage unit 226/326 of stylus device 110/210/310.

Proceeding with flowchart 400 using the first mode, flowchart 400 continues with receiving a movement of a magnet 222/322 in relation to an inductor 224/324 (430a). The receiving a movement may correspond to shaking, jostling, twirling, rotating, or moving stylus device 110/210/310 causing magnet 222/322 to move in relation to inductor 224/324. User 102 may shake stylus device 110/210/310 or stylus device 110/210/310 may be placed where stylus device 110/210/310 will receive movements. As previously discussed, when charging using the first mode, magnet 222/322 may be free to move or may be unlocked to allow freedom of movement in relation to inductor 224/324. Furthermore, magnet 222/322 may be free to move within a chamber, on a track, or within some other configuration. Stylus device 110/210/310 may be set up to prevent damage to magnet 222/322 during movement, such as by utilizing rubber padding, magnetic cushioning, or other cushioning.

Moving on with the first mode of flowchart 400, flowchart 400 continues with inducing a first electrical current in the inductor 224/324 from the movement (440a). The inducing may be performed by creating a changing magnetic flux through inductor 224/324 based on the movement of magnet 222/322. By moving magnet 222/322 near and/or around inductor 224/324, a current may be induced in a circuit including inductor 224/324.

The first mode of flowchart 400 continues with charging an energy storage unit 226/326 using the first electrical current (450a). Utilizing the current induced from magnet 222/322 and inductor 224/324, energy storage unit 226/326 can be charged. As previously discussed, additional power conditioning and/or processing circuitry may be required as a person of ordinary skill in the art would appreciate. Energy storage unit 226/326 may correspond to a capacitor that holds a charge of a period of time for use by stylus device 110/210/310. Alternatively, energy storage unit 226/326 may correspond to a more long term energy storage solution, such as a rechargeable battery. Stylus device 110/210/310 may utilize energy storage unit 226/326 to power features of stylus device 110/210/310, such as stylus feature 214.

As previously discussed, based on the selection of charging stylus device 110/210/310 using the first mode or the second mode, flowchart 400 may proceed to 420a or 420b. If the second mode is selected, flowchart 400 proceeds to wherein the second mode includes (420b). The second mode may correspond to inductively charging energy storage unit 225/326 of stylus device 110/210/310.

Proceeding with flowchart 400 using the second mode, flowchart 400 continues with inducing a second electrical current in inductor 224/324 from a non-kinetic source (430b). The inducing the second electrical current in inductor 224/324 may be performed by inductive charger 106/306 creating electromagnetic field 328 to induce the second electrical current in inductor 224/324. Inductive charger 106/306 may correspond to a general inductive charger for multiple devices or an inductive charger made specifically for stylus device 110/210/310.

The second mode of flowchart 400 continues with charging the energy storage unit 226/326 using the second electrical current (450a). Utilizing the second current induced from electromagnetic field 328 and inductor 224/324, energy storage unit 226/326 can be charged. As previously discussed, energy storage unit 226/326 may correspond to a capacitor that holds a charge of a period of time for use by stylus device 110/210/310. Alternatively, energy storage unit 226/326 may correspond to a rechargeable battery, fuel cell, or other power source. Stylus device 110/210/310 may utilize energy storage unit 226/326 then to power feature of stylus device 110/210/310, such as stylus feature 214.

Thus, an active stylus may be configured to be kinetically charged so that a user can utilize the stylus without worrying about a power source. Further, the stylus can also be inductively charged utilizing the power unit setup of the kinetically chargeable stylus. This allows a user flexibility in use and reassurance that the stylus will have access to power when necessary.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifica-

What is claimed is:

1. A device comprising:
a power unit including an inductor, a magnet, and an energy storage unit;
a first mode; and
a second mode;
wherein, in response to a selection of the first mode, the power unit is configured to perform:
receiving a movement of the magnet in relation to the inductor;
inducing a first electrical current in the inductor from the movement; and
charging the energy storage unit using the first electrical current;
wherein, in response to a selection of the second mode, the power unit is configured to perform:
isolating the magnet from the inductor;
inducing, after the isolating of the magnet from the inductor, a second electrical current in the inductor from a non-kinetic source; and
charging the energy storage unit using the second electrical current.

2. The device of claim 1, wherein the non-kinetic source is a charging station.

3. The device of claim 1, wherein the non-kinetic source is an inductive charger.

4. The stylus device of claim 1, wherein the magnet is isolated from the inductor using a charging station.

5. The device of claim 1, wherein the magnet is isolated from the inductor using gravity.

6. The device of claim 1, further comprising:
at least one input button, wherein the magnet is isolated from the inductor using the at least one input button.

7. The device of claim 1, wherein the power unit is further configured to:
detect a movement of the device by detecting a change in the first electrical current induced in the inductor from the movement of the magnet.

8. A stylus device for use with an interactive device, the stylus device comprising:
a control unit;
a first mode;
a second mode;
at least one input button; and
a power unit including an inductor, a magnet, and an energy storage unit;
wherein, in response to a selection of the first mode, the power unit is configured to perform:
receiving a movement of the magnet in relation to the inductor;
inducing a first electrical current in the inductor from the movement; and
charging the energy storage unit using the first electrical current;
wherein, in response to a selection of the second mode, the power unit is configured to perform:
isolating the magnet from the inductor;
inducing, after the isolating of the magnet from the inductor, a second electrical current in the inductor from a non-kinetic source; and
charging the energy storage unit using the second electrical current.

9. The stylus device of claim 8, wherein the non-kinetic source is a charging station.

10. The stylus device of claim 8, wherein the non-kinetic source is an inductive charger.

11. The stylus device of claim 8, wherein the magnet is isolated from the inductor using a charging station.

12. The stylus device of claim 8, wherein the magnet is isolated from the inductor using gravity.

13. The stylus device of claim 8, wherein the magnet is isolated from the inductor using the at least one input button.

14. The stylus device of claim 8, wherein the power unit is further configured to:
detect a movement of the stylus device by detecting a change in the first electrical current induced in the inductor from the movement of the magnet.

15. A method for use by a stylus device, the method comprising:
receiving a selection of a first mode, and in response to the receiving of the selection of the first mode, perform:
receiving a movement of a magnet in relation to an inductor;
inducing a first electrical current in the inductor from the movement; and
charging an energy storage unit using the first electrical current:
receiving a selection of a second mode, and in response to the receiving of the selection of the second mode, perform:
isolating the magnet from the inductor;
inducing, after the isolating of the magnet from the inductor, a second electrical current in the inductor from a non-kinetic source; and
charging the energy storage unit using the second electrical current.

16. The method of claim 15 further comprising:
detecting a movement of the stylus device by detecting a change in the first electrical current induced in the inductor from the movement of the magnet.

* * * * *